United States Patent [19]

Ziegler

[11] 3,790,769

[45] Feb. 5, 1974

[54] SYSTEM FOR FAULT DETECTION AND LOCATION ON DATA LINES

[75] Inventor: Reinhold Ziegler, Stuttgart-Munster, Germany

[73] Assignee: International Standard Electric Corporation, New York, N.Y.

[22] Filed: Nov. 21, 1972

[21] Appl. No.: 308,378

[30] Foreign Application Priority Data

Dec. 1, 1971 Germany .................. P 21 59 675.8

[52] U.S. Cl. .................. 235/153 AK, 340/146.1 AX

[51] Int. Cl. .................. G06f 11/04

[58] Field of Search.....340/146.1 AX, 146.1 BA 340/146.1 E, 172.5; 178/23 A; 235/153 AK

[56] References Cited

UNITED STATES PATENTS

| | | | |
|---|---|---|---|
| 3,248,697 | 4/1966 | Montgomery | 340/136.1 AX |
| 3,711,829 | 1/1973 | Lubrano | 340/146.1 AX |
| 3,732,541 | 5/1973 | Neubauer | 340/146.1 BA |

*Primary Examiner*—Charles E. Atkinson
*Attorney, Agent, or Firm*—John T. O'Halloran; Menotti J. Lombardi, Jr.; Alfred C. Hill

[57] ABSTRACT

Whenever faults or errors are detected in the receive data signal at one station of a data link, a predetermined signal requesting transmission of a special signal is transmitted to the other station of the data link. If the special signal is not correctly received at the one station, a changeover occurs and the transmitter and receiver within each station are interconnected. Check signals are transmitted and from the results it can be determined whether the fault is due to bit errors, a faulty transmitter and/or a faulty receiver of either or both of the stations or a faulty line interconnecting the stations.

16 Claims, 3 Drawing Figures

SYSTEM FOR FAULT DETECTION AND LOCATION ON DATA LINES

BACKGROUND OF THE INVENTION

This invention relates to fault detection and location systems and more particularly to a system for determining the type and location of faults during the transmission of data signals.

During the transmission of data signals, it must always be insured that no trouble occurs which may result in wrong information. The trouble may be so-called "permanent faults" resulting when an element of the transmission link is disturbed, or so-called "bit errors" if a bit is changed, for example, by external influences while the equipment otherwise operates perfectly. In centrally controlled telephone systems, parts such as concentrators are frequently located at a distant point, and information in the form of data signals must be transmitted between the exchange and the concentrator. From the concentrator to the exchange, the following information is transmitted, for example: subscriber information, acknowledgement information, alarms: and from the exchange to the concentrator: setting instructions, switching instructions, acknowledgement information.

A simple possibility of supervision consists of each communicated message being acknowledged by an acknowledgement message. In that case, however, any trouble is detected very late, and neither the type nor the location of the trouble can be determined from the fact that no acknowledgement message has arrived.

It is also possible to transmit special check information. If this information is not correctly received, trouble is signalled, and changeover to a substitute link takes place. Any distinction between permanent faults and bit errors is impossible because each permanent fault first has the effect of a bit error. By the changeover to a substitute link with each bit error, the central equipment which performs this control is loaded.

SUMMARY OF THE INVENTION

It is an object of the present invention to provide a system for determining the type and location of trouble during the transmission of data signals which permits such determinations to be carried out in the simplest possible manner. Also, the expenditure is kept to a minimum.

A feature of the present invention is the provision of a system for determining the type and location of trouble during the transmission of data signals comprising: a first station including a first transmitter, a first receiver, and a first data signal checking circuit coupled to the first receiver to determine the condition of data signals received at the first receiver; a second station including a second transmitter coupled to the first receiver to transmit data signals thereto, a second receiver coupled to the first transmitter to receive data signals transmitted therefrom, and a second data signal checking circuit coupled to the second receiver to determine the condition of data signals received at the second receiver; first means disposed in either of the first and second stations, the first means being coupled to the associated one of the first and second checking circuit in one of the first and second stations to detect errors in the data signals received by the associated one of the first and second receivers and to produce a first signal requesting the transmission of a special signal from the other of the first and second stations when an error is detected in the data signals received by the associated one of the first and second receivers, the first signal being transmitted from the associated one of the first and second transmitters of the one of the first and second stations to the associated one of the first and second receiver of the other of the first and second stations; second means disposed in either of the first and second stations, the second means of the other of the first and second stations being responsive to the first signal to generate the special signal for transmission of the one of the first and second stations, the special signal being transmitted from the associated one of the first and second transmitters of the other of the first and second stations to the associated one of the first and second receivers of the one of the first and second stations; third means disposed in either of the first and second stations, the third means being coupled to the associated one of the first and second receivers of the one of the first and second stations to detect errors in the special signal and to produce a second signal when the special signal is in error; and fourth means disposed in either of the first and second stations; the fourth means of the one of the first and second stations being coupled to the third means of the one of the first and second stations, the fourth means being responsive to the second signal to interconnect the associated one of the first and second transmitters of the one of the first and second stations to the associated one of the first and second receivers of the one of the first and second stations; the third means of the one of the first and second stations reacting to this latter interconnection to indicate whether the detected errors are due to faulty operation of the associated one of the first and second receivers of the one of the first and second stations.

The resulting advantage is that a distinction can be made between a permanent fault and a bit error, and that one of the two stations or the line can be fixed as the location of the fault.

A further feature of the invention is characterized in that, if use is made of converter sets, the receiving equipment is connected, in a further checking step, to the station's own transmitting equipment via the station's converter sets. This permits additional checking of the converter sets.

BRIEF DESCRIPTION OF THE DRAWING

Above-mentioned and other features and objects of this invention will become more apparent with reference to the following description taken in conjunction with the accompanying drawing, in which.

DESCRIPTION OF THE PREFERRED EMBODIMENTS

Figure 1:
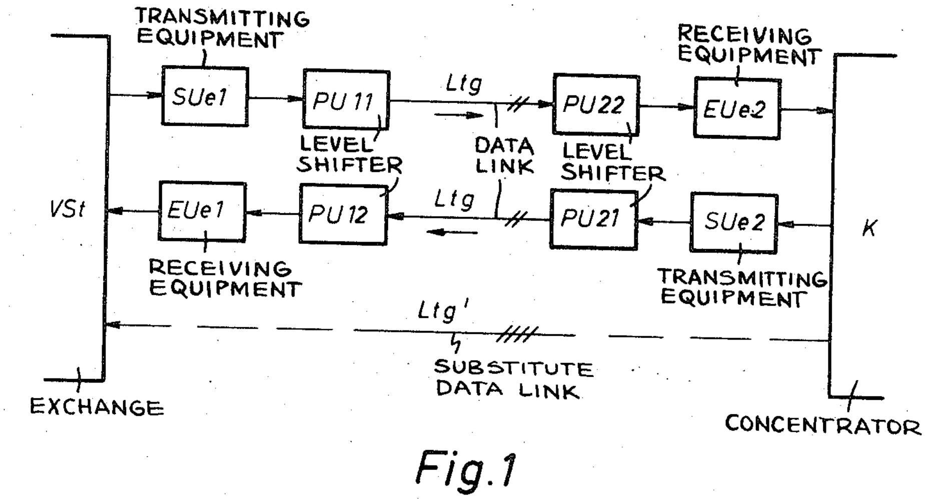
FIG. 1 shows a block diagram of a transmission link that may employ the fault detecting and locating system in accordance with the principles of the present invention.

Referring to FIG. 1 there is provided between an exchange VSt and a concentrator K at least two data links Ltg and one data link Ltg' serving as a substitute link. The information is applied from exchange VSt via the transmitting equipment SUel and the level shifter PU11 to line Ltg and from there via another level shifter PU22 and the receiving equipment EUe2 to concentrator K. The two level shifters are inserted in order to adapt the level of the transmitting and receiving equipments to the optimum level for the line.

The opposite direction from concentrator K to exchange VSt includes transmitting equipment SUe2, level shifter PU21, line Ltg, level shifter PU12, and receiving equipment EUel.

Figure 2:
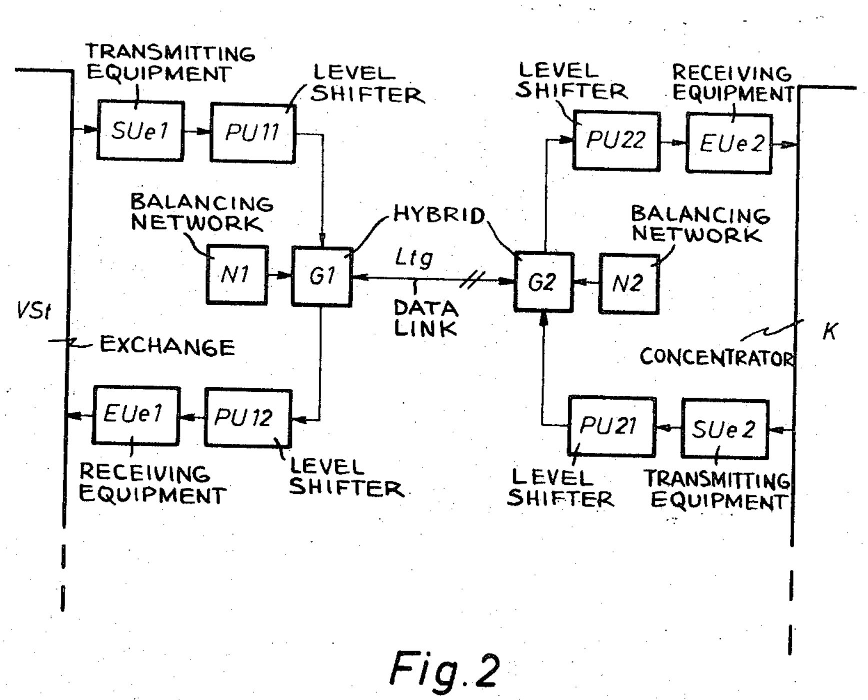
FIG. 2 shows a block diagram of a modification of FIG. 1 for two-wire operation.

If, instead of the four-wire circuit provided in the embodiment of FIG. 1, only a two-wire circuit is available, hybrids G1 and G2 and balancing networks N1 and N2 must be additionally employed as is shown in FIG. 2.

Figure 3:
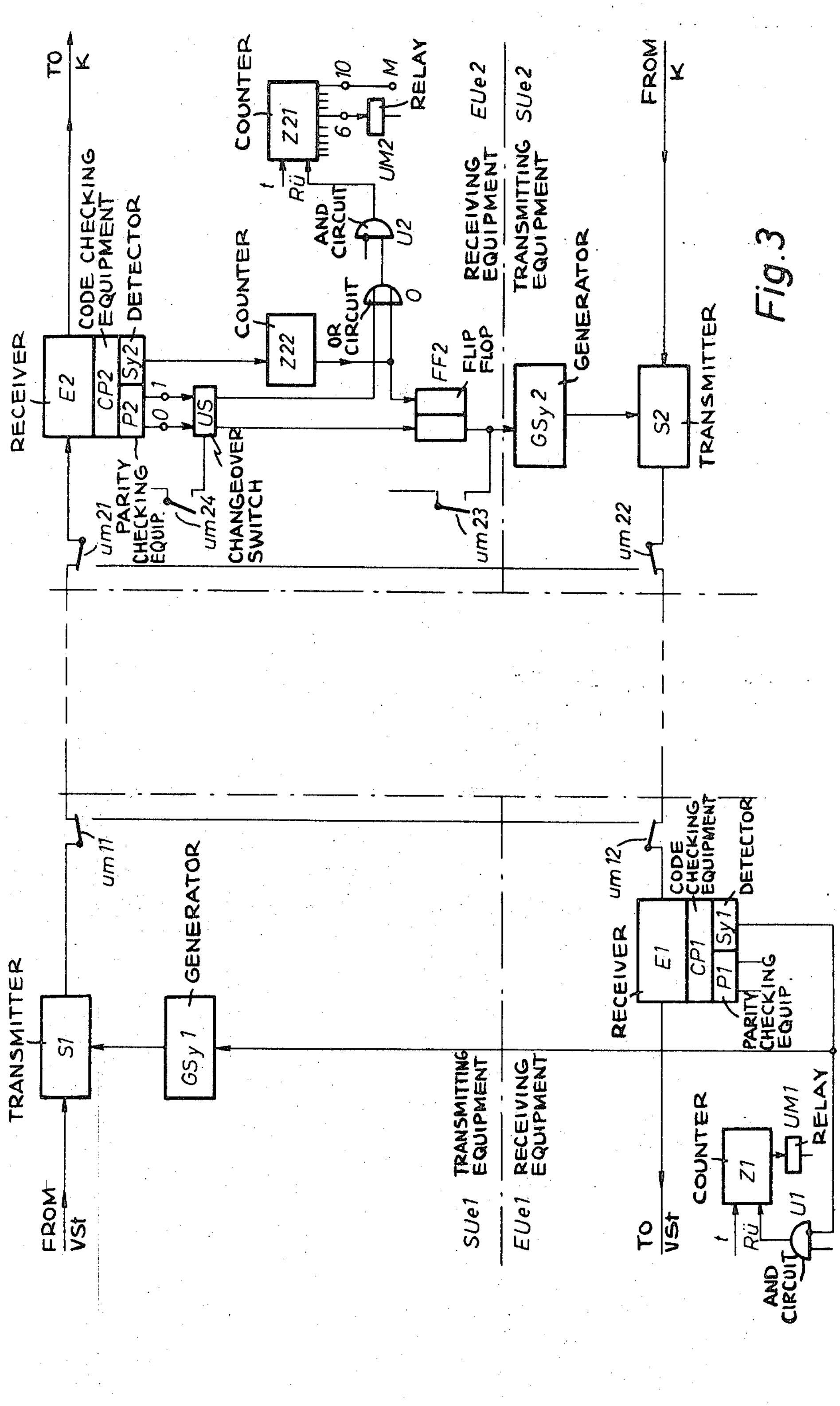
FIG. 3 shows a simplified block diagram of the terminals of the link incorporating the fault detecting and locating system in accordance with the principles of the present invention.

For the description it is assumed that a fault is detected in receiving equipment EUe2. For simplicity, the block diagram (FIG. 3) of the two terminals shows only those parts and connections which are necessary for the description. Since trouble may develop in both directions, the corresponding equipments are present in the other terminal also.

The signals to be transmitted from exchange VSt are transmitted via the transmitter S1 to the receiver E2 in receiving equipment EUe2 and then passed on to concentrator K. In the code-checking equipment CP2, connected to receiver E2, each signal is checked for parity. Other checks are possible, too. If the signal was received correctly, the parity-checking equipment P2 delivers via output 1 a signal which is applied via the changeover switch US, the OR circuit O and the AND-circuit U2 to the reset input Ru of the counter Z21. The counter is advanced by clock pulses t and, after each correctly received signal, reset. The spacing between the clock pulses t is chosen so that a signal can be accommodated and interpreted between two clock pulses. Since, however, the clock pulses are independent of the reception of a signal, the counter can, during normal operation, reach the position 1 at the most and is then reset.

If the parity check of a signal results in a wrong value, a signal is delivered from the output 0 of the parity-checking device P2. At that instant it is not known yet whether this is caused by a sporadic bit error or by a permanent fault. This signal from the output 0 controls, via the changeover switch US, the flip-flop FF2, which, in transmitting equipment SUe2, starts a generator GSy2 for the synchronizing signal, which is now transmitted via the transmitter S2 to the opposite station as a request for the transmission of a special signal. In the code-checking equipment CP1, connected to the receiver E1 of receiving equipment EUel, this request for transmission of a special signal is recognized, and the circuit Syl delivers a signal which is used, on the one hand, to inhibit the AND-circuit U1, so that the counter Z1 can no longer be reset, and, on the other hand, to start, in transmitting equipment SUel, the generator GSyl for the synchronizing signal. This synchronizing signal is now transmitted as a special signal to receiving equipment EUe2. If this signal is correctly received there, the special signal detector Sy2 transmits a signal by which the counter Z22 is advanced by one digit. As soon as the synchronizing signal has been correctly received, for example, four times in a row, it can be assumed that the last detected trouble was only a sporadic bit error, and that the line is not disturbed. With the output signal of counter Z22, (after four correct receptions of the special signal), flip-flop FF2 is reset, and counter Z21 is now reset via OR-circuit 0 and AND-circuit U2. At that instant, counter Z21 has not yet reached the position 6. A faulty signal and four correct signals correspond to five clock pulses. When flip-flop FF2 is reset, generator GSy2 is switched off. Receiving equipment EUel no longer receives the synchronizing signal and, in response thereto, switches off generator GSyl and enables the resetting of counter Z1. Now, normal signal transmission takes place again, and a corresponding information is transmitted to the central unit. If, however, the four synchronizing signals are not correctly received in receiving equipment EUe2, the cause is a permanent fault. Counter Z21 reaches the position 6 and actuates the relay UM2. With the contacts um21 and um22, the line with the level shifters is disconnected, and at the same time a connection is established between transmitter S2 and receiver E2 of concentrator K. Contact un23 um23 generator GSy2 switched on, and contact um24 serves to actuate changeover switch US, which interchanges the outputs of parity-checking equipment P2.

This interchange is necessary because, in the two directions, transmission takes place with different parity. If, in the case of two-wire operation, there is a line fault on the two-wire side, the balancing network is out of balance, and the transmitter may then transmit to the receiver of its own station. The signals would be received correctly although there is trouble. If, however, different parity is used for the two directions, this trouble can be detected immediately and serve as an additional clue to fault localization.

Receiver E2 now interprets the received signals again. If these signals are received correctly, it can be assumed that the equipments associated with the concentrator operate correctly. At the step 10 of counter Z21, a message about the result can then be transmitted via output M over the substitute channel. It is also sufficient if either only "good" or only "no good" is transmitted. About simultaneously with relay UM2, the relay UM 1 is actuated by counter Z1. Via its contacts um11 and um12, relay UM1 disconnects the line and connects transmitter S1 to receiver E1. When relay UM1 picks up, a permanent-fault message is sent to the central unit. Here, too, the same checking operation takes place, If both stations now transmit a "good" message, the fault must be on the line or in the level shifters.

During intervals between data signals being transmitted, test signals (the request for a special signal and the special signal) are transmitted, so that continuous supervision takes place, the counter always being reset also.

For further localizing the position of the fault, it is possible, for example, to actuate at the step 10 of counter Z21 another relay which disconnects the line behind the level shifter and interconnects the two level shifters of a station. At the same time, the direct connection between transmitter and receiver is canceled. Then, the synchronizing combination is again transmitted from the transmitter via the two level shifters to the station's own receiver and interpreted there. By this additional checking step, five possible sections are obtained for the location of the fault, namely: transmitting or receiving equipments at the exchange, level shifter at the exchange, line, level shifter at the concentrator, and, receiving or transmitting equipments at the concentrator.

While I have described above the principles of my invention in connection with specific apparatus it is to be clearly understood that this description is made only by way of example and not as a limitation to the scope of my invention as set forth in the objects thereof and in the accompanying claims.

I claim:

1. A system for determining the type and location of trouble during the transmission of data signals comprising:

a first station including a first transmitter, a first receiver, and a first data signal checking circuit coupled to said first receiver to determine the condition of data signals received at said first receiver;

a second station including a second transmitter coupled to said first receiver to transmit data signals thereto, a second receiver coupled to said first transmitter to receive data signals transmitted therefrom, and a second data signal checking circuit coupled to said second receiver to determine the condition of data signals received at said second receiver;

first means disposed in both of said first and second stations, said first means being coupled to the associated one of said first and second checking circuit in one of said first and second stations to detect errors in said data signals received by the associated one of said first and second receivers and to produce a first signal requesting the transmission of a first special signal from the other of said first and second stations when an error is detected in said data signals received by said associated one of said first and second receivers, said first signal being transmitted from the associated one of said first and second transmitters of said one of said first and second stations to the associated one of said first and second receiver of said other of said first and second stations;

second means disposed in both of said first and second stations, said second means of said other of said first and second stations being responsive to said first signal to generate siad first special signal for transmission to said one of said first and second stations, said first special signal being transmitted from the associated one of said first and second transmitters of said other of said first and second stations to the associated one of said first and second receivers of said one of said first and second stations;

third means disposed in both of said first and second stations, said third means being coupled to the associated one of said first and second receivers of said one of said first and second stations to detect errors in said first special signal and to produce a second signal when said first special signal is in error; and fourth means disposed in both of said first and second stations, said fourth means of said one of said first and second stations being coupled to said third means of said one of said first and second stations, said fourth means being responsive to said second signal to interconnect the associated one of said first and second transmitters of said one of said first and second stations to the associated one of said first and second receivers of said one of said first and second stations;

said third means of said one of said first and second stations reacting to this latter interconnection to indicate whether said detected errors are due to faulty operation of the associated one of said first and second receivers of said one of said first and second stations.

2. A system according to claim 1, further including said first means coupled to the associated one of said first and second checking circuit in said other of said first and second stations to detect errors in said data signals received by the associated one of said first and second receivers and to produce a third signal requesting the transmission of a second special signal from said one of said first and second stations when an error is detected in said data signals received by said associated one of said first and second receivers, said third signal being transmitted from the associated one of said first and second transmitters of said other of said first and second stations to the associated one of said first and second receiver of said one of said first and second stations;

said second means of said one of said first and second stations being responsive to said third signal to generate said second special signal for transmission to said other of said first and second stations, said second special signal being transmitted from the associated one of said first and second transmitters of said one of said first and second stations to the associated one of said first and second receivers of said other of said first and second stations;

said third means being coupled to the associated one of said first and second receivers of said other of said first and second stations to detect errors in said second special signal and to produce a fourth signal when said second special signal is in error; and fifth means disposed in both of said first and second stations, said fifth means being coupled to said third means of said other of said first and second stations responsive to said fourth signal to substantially simultaneously with said fourth means of said one of said first and second stations interconnect the associated one of said first and second transmitters of said other of said first and second stations with the associated one of said first and second receivers of said other of said first and second stations to provide an indication of whether said detected errors are due to faulty operation of the associated one of said first and second transmitters of said other of said first and second stations.

3. A system according to claim 2, wherein said data signal received by said first and second receivers each include a parity code, and said first and second checking circuits check said parity code to determine if the associated one of said data signals contains an error.

4. A system according to claim 3, wherein said parity code is different for said data signal received by said second receiver and for said data signal received by said first receiver.

5. A system according to claim 4, wherein when said fourth means and said fifth means interconnect their associated transmitters and receivers said first and second checking circuits appropriately change their parity code check.

6. A system according to claim 1, wherein said data signal received by said first and second receivers each include a parity code, and said first and second checking circuits check said parity code to determine if the associated one of said data signals contains an error.

7. A system according to claim 6, wherein said parity code is different for said data signal received by said second receiver and for said data signal received by said first receiver.

8. A system according to claim 7, wherein when said fourth means interconnects the associated one of said first and second transmitters of said one of said first and second stations and the associated one of said first and second receivers of said one of said first and second stations the associated one of said first and second checking circuit of said first and second station appropriately changes its parity code check.

9. A system according to claim 1, further including a timing circuit disposed in both of said first and second stations, said timing circuit being coupled to the ssociated one of said third means which is reset whenever data signals are correctly received and which is not reset whenever data signals are incorrectly received to control the time sequence of error locating steps.

10. A system according to claim 1, wherein said first signal and said special signal are transmitted in intervals between data signals.

11. A system according to claim 2, wherein said fourth means of said other of said first and second stations is coupled to said third means of said other of said first and second stations, said fourth means being responsive to said fourth signal to interconnect the associated one of said first and second transmitters of said other of said first and second stations to the associated one of said first and second receivers of said other of said first and second stations and said fifth means is coupled to said third means of said first and second stations responsive to said second signal to substantially simultaneously with said fourth means of said other of said first and second stations interconnect the associated one of said first and second transmitters of said one of said first and second stations with the associated one of said first and second receivers of said one of said first and second stations to provide an indication of whether said detected errors are due to faulty operation of the associated one of said first and second transmitters of said one of said first and second stations.

12. A system according to claim 11, wherein said data signal received by said first and second receivers each include a parity code, and said first and second checking circuits check said parity code to determine if the associated one of said data signals contains an error.

13. A system according to claim 12, wherein said parity code is different for said data signal received by said second receiver and for said data signal received by said first receiver.

14. A system according to claim 13, wherein when said fourth means and said fifth means interconnect their associated transmitters and receivers said first and second checking circuits appropriately change their parity code check.

15. A system according to claim 11, further including a timing circuit disposed in both of said first and second stations, said timing circuit being coupled to the associated one of said third means which is reset whenever data signals are correctly received and which is not reset whenever data signals are incorrectly received to control the time sequence of error locating steps.

16. A system according to claim 11, wherein said first signal and said special signal are transmitted in intervals between data signals.

* * * * *